US008121706B2

(12) United States Patent
Morikawa

(10) Patent No.: US 8,121,706 B2
(45) Date of Patent: Feb. 21, 2012

(54) INFORMATION PROCESSING DEVICE AND HOME NETWORK SYSTEM

(75) Inventor: Masanobu Morikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 524 days.

(21) Appl. No.: 12/332,899

(22) Filed: Dec. 11, 2008

(65) Prior Publication Data

US 2009/0157198 A1    Jun. 18, 2009

(30) Foreign Application Priority Data

Dec. 13, 2007 (JP) ................................ 2007-322447

(51) Int. Cl.
    G05B 19/18    (2006.01)
    G05B 15/00    (2006.01)
    G05B 19/42    (2006.01)
    G05B 19/02    (2006.01)
    G06F 15/16    (2006.01)
    G06F 15/177   (2006.01)
    H04N 7/18     (2006.01)

(52) U.S. Cl. .................. 700/2; 700/83; 700/86; 700/12; 340/4.3; 709/205; 709/220; 709/203; 725/74

(58) Field of Classification Search .............. 700/2, 83, 700/86, 12; 340/4.3; 709/205, 220, 203; 725/74

See application file for complete search history.

(56) References Cited

U.S. PATENT DOCUMENTS

| 6,233,611 | B1 * | 5/2001 | Ludtke et al. ................. 709/223 |
| 6,466,971 | B1 * | 10/2002 | Humpleman et al. ........ 709/220 |
| 2003/0009760 | A1 * | 1/2003 | Sakamoto et al. .............. 725/74 |
| 2003/0038730 | A1 * | 2/2003 | Imafuku et al. .......... 340/825.24 |
| 2008/0040430 | A1 * | 2/2008 | Shivaji-Rao ................. 709/205 |

* cited by examiner

*Primary Examiner* — Albert Decady
*Assistant Examiner* — Jason Lin
(74) *Attorney, Agent, or Firm* — McDermott Will & Emery LLP

(57) ABSTRACT

There is provided an information processing device capable of dynamically generating and presenting to the user a user interface for remotely controlling at least one other device connected via a network and performing conjunctive operations between the information processing device and the other device, the interface being generated in accordance with the type of the other device. Remote control commands are shared between the networked information processing devices, including commands for controlling devices controlled by different protocols, combinations of commands available for the conjunctive operations are extracted from the remote control commands, and when requested by a terminal device to present remote operations, the type of the terminal device is determined to present the remote operations.

13 Claims, 16 Drawing Sheets

| | | | | | | DISCLOSING CONDITION | | |
|---|---|---|---|---|---|---|---|---|
| OPERATION NAME | DISPLAY NAME | DISPLAY FORMAT | VALUE | DEVICE CONTROL FUNCTION | DISCLOSING DESTINATION | UI DISPLAY | DEVICE STATUS | |
| 301 | 302 | 303 | 304 | 305 | 307 | 308 | 306 | 309 |
| <power> | POWER | <bool> | ON, OFF | Set_power | R | Y | NO CONSIDERATION | |
| <channel> | CHANNEL | <button> | UP, DOWN | Set_channel | R | Y | NO CONSIDERATION | |
| <volume> | VOLUME | <button> | UP, DOWN | Set_volume | R | Y | NO CONSIDERATION | |
| <input-mode> | INPUT MODE | <pulldown> | TD, BS, CS, HDMI, NETWORK | Set_input_mode | L, R | Y | NO CONSIDERATION | |
| <stream-recv> | RECEPTION VIA STREAMING | <bool> | START, STOP | Start_stream_recv | L, R | Y | NO CONSIDERATION | |
| <stream-trans> | | | | Start_stream_trans | L, R | N | NO CONSIDERATION | |
| <configuration> | SETTINGS | <button> | SET | Launch_menu | L | Y | NO CONSIDERATION | |
| <play> | PLAY | <button> | START PLAYING, STOP PLAYING | Start_play | L, R*S | Y | DVR SHOULD BE CONNECTED VIA HDMI | |
| <change-list> | PROGRAM CHANGE | <button> | PREVIOUS PROGRAM, NEXT PROGRAM | Set_list | L, R*S | Y | DVR SHOULD BE CONNECTED VIA HDMI | |
| <playlist> | PLAYLIST | <button> | PLAYLIST DISPLAY | Launch_playlist | L, R*S | Y | DVR SHOULD BE CONNECTED VIA HDMI | |
| <stream-trans> | TRANSMISSION VIA STREAMING | <button> | STREAMING, MOVE, STOP | Start_stream_trans | L, R*S | Y | DVR SHOULD BE CONNECTED VIA HDMI | |
| <stream-recv> | RECEPTION VIA STREAMING | <bool> | START, STOP | Start_stream_recv | L, R | Y | DVR SHOULD BE CONNECTED VIA HDMI | |
| <stream-rec> | | | | Start_stream_rec | L, R | N | DVR SHOULD BE CONNECTED VIA HDMI | |
| <rec_reserve> | PROGRAMMED RECORDING | <button> | PROGRAMMED RECORDING | Set_rec_reserve | L, R*S | Y | DVR SHOULD BE CONNECTED VIA HDMI | |

FIG. 4

| OPERATION NAME | DISPLAY NAME | DISPLAY FORMAT | VALUE | DISCLOSING CONDITION | | REQUIRED COMMAND | EXECUTION COMMAND |
| --- | --- | --- | --- | --- | --- | --- | --- |
| | | | | DISCLOSING DESTINATION CONDITION | UI CONDITION | | |
| <conj-stream-play> | CONJUNCTIVE PLAY VIA STREAMING | <button> | START, STOP | L, R | Y | <stream-recv> <stream-trans> | <input-mode network> <stream-recv> <stream-trans> |

| DEVICE ID | OPERATION NAME | DISPLAY NAME | DISPLAY FORMAT | VALUE | DEVICE CONTROL FUNCTION | DISCLOSING DESTINATION | DISCLOSING CONDITION |
|---|---|---|---|---|---|---|---|
| DTV1 | <power> | POWER | <bool> | ON, OFF | Set_power | R | Y |
| DTV1 | <channel> | CHANNEL | <button> | UP, DOWN | Set_channel | R | Y |
| DTV1 | <volume> | VOLUME | <button> | UP, DOWN | Set_volume | R | Y |
| DTV1 | <input-mode> | INPUT MODE | <pulldown> | TD, BS, CS, HDMI, NETWORK | Set_input_mode | L, R | Y |
| DTV1 | <stream-recv> | RECEPTION VIA STREAMING | <bool> | START, STOP | Start_stream_recv | L, R | Y |
| DTV1 | <stream-trans> | — | — | — | Start_stream_trans | L, R | N |
| DTV1 | <configuration> | SETTINGS | <button> | SET | Launch_menu | L | Y |
| DTV2 | <power> | POWER | <bool> | ON, OFF | Set_power | R | Y |
| DTV2 | <play> | PLAY | <button> | START PLAYING, STOP PLAYING | Start_play | L, R*S | Y |
| DTV2 | <change-list> | PROGRAM CHANGE | <button> | PREVIOUS PROGRAM, NEXT PROGRAM | Set_list | L, R*S | Y |
| DTV2 | <playlist> | PLAYLIST | <button> | PLAYLIST DISPLAY | Launch_playlist | L, R*S | Y |
| DTV2 | <stream-trans> | TRANSMISSION VIA STREAMING | <button> | STREAMING, MOVE, STOP | Start_stream_trans | L, R*S | Y |
| DTV2 | <stream-recv> | RECEPTION VIA STREAMING | <bool> | START, STOP | Start_stream_recv | L, R*S | Y |
| DTV2 | <stream-rec> | — | — | — | Start_stream_rec | L, R | N |
| DTV2 | <rec_reserve> | PROGRAMMED RECORDING | <button> | PROGRAMMED RECORDING | Set_rec_reserve | L, R*S | Y |
| DVC1 | <power> | POWER | <bool> | ON, OFF | Set_power | R | Y |
| DVC1 | <play> | PLAY | <button> | START PLAYING, STOP PLAYING | Start_play | L, R*S | Y |
| DVC1 | <play-control> | REWIND/FAST-FORWARD | <button> | REWIND, FAST-FORWARD | Start_play_control | L, R*S | Y |
| DVC1 | <stream-trans> | TRANSMISSION VIA STREAMING | <button> | STREAMING, MOVE, STOP | Start_stream_trans | L, R*S | Y |
| DVC1 | <shot-movie> | — | — | — | Start_shot_movie | L, R | N |
| CONJ | <conj-stream-play> | CONJUNCTIVE PLAY VIA STREAMING | <button> | START, STOP | — | L, R | Y |

FIG. 13

| OPERATION NAME | DISPLAY NAME | DISPLAY FORMAT | VALUE | DEVICE CONTROL FUNCTION | DISCLOSING CONDITION | | |
|---|---|---|---|---|---|---|---|
| | | | | | DISCLOSING DESTINATION | UI DISPLAY | DEVICE STATUS |
| ⟨power⟩ | POWER | ⟨bool⟩ | ON, OFF | Set_power | R | Y | NO CONSIDERATION |
| ⟨play⟩ | PLAY | ⟨button⟩ | START PLAYING, STOP PLAYING | Start_play | L, R*S | Y | NO CONSIDERATION |
| ⟨play-control⟩ | REWIND/FAST-FORWARD | ⟨button⟩ | REWIND, FAST-FORWARD | Start_play_control | L, R*S | Y | NO CONSIDERATION |
| ⟨stream-trans⟩ | TRANSMISSION VIA STREAMING | ⟨button⟩ | STREAMING, MOVE, STOP | Start_stream_trans | L, R*S | Y | NO CONSIDERATION |
| ⟨shot-movie⟩ | – | – | – | Start_shot_movie | L, R | N | NO CONSIDERATION |

| OPERATION NAME | DISPLAY NAME | DISPLAY FORMAT | VALUE | DEVICE CONTROL FUNCTION | DISCLOSING DESTINATION | DISCLOSING CONDITION | |
|---|---|---|---|---|---|---|---|
| | | | | | | UI DISPLAY | DEVICE STATUS |
| ⟨service-tv-telephone⟩ | - | - | - | Start_tv_telephone | L,R | N | NO CONSIDERATION |

301 OPERATION NAME
302 DISPLAY NAME
303 DISPLAY FORMAT
304 VALUE
305 DEVICE CONTROL FUNCTION
306 DISCLOSING CONDITION
307 DISCLOSING DESTINATION
308 UI DISPLAY
309 DEVICE STATUS
300

FIG. 15

| OPERATION NAME | DISPLAY NAME | REQUIRED COMMAND | EXECUTION COMMAND |
|---|---|---|---|
| ⟨conj-tv-telephone⟩ | CONJUNCTIVE TELEVISION PHONE | ⟨stream-trans⟩ ⟨shot-movie⟩ ⟨stream-recv⟩ ⟨service-tv-telephone⟩ | ⟨stream-trans⟩ ⟨shot-movie⟩ ⟨input-mode network⟩ ⟨stream-recv⟩ ⟨service-tv-telephone⟩ |

| | 600 | 601 | 602 | 603 | 604 | 605 | 606 607 608 |
|---|---|---|---|---|---|---|---|
| DEVICE ID | OPERATION NAME | DISPLAY NAME | DISPLAY FORMAT | VALUE | DEVICE CONTROL FUNCTION | DISPLAYING CONDITION / DISPLAYING DESTINATION | UI CONDITION |
| DTV1 | <power> | POWER | <bool> | ON, OFF | Set_power | R | Y |
| DTV1 | <channel> | CHANNEL | <button> | UP, DOWN | Set_channel | R | Y |
| DTV1 | <volume> | VOLUME | <button> | UP, DOWN | Set_volume | R | Y |
| DTV1 | <input-mode> | INPUT MODE | <pulldown> | TD, BS, CS, HDMI, NETWORK | Set_input_mode | L, R | Y |
| DTV1 | <stream-recv> | RECEPTION VIA STREAMING | <bool> | START, STOP | Start_stream_recv | L, R | Y |
| DTV1 | <stream-trans> | — | — | — | Start_stream_trans | L, R | N |
| DTV1 | <configuration> | SETTINGS | <button> | SET | Launch_menu | L | Y |
| DVC1 | <power> | POWER | <bool> | ON, OFF | Set_power | R | Y |
| DVC1 | <play> | PLAY | <button> | START PLAYING, STOP PLAYING | Start_play | L, R*S | Y |
| DVC1 | <play-control> | REWIND/FAST-FORWARD | <button> | REWIND, FAST-FORWARD | Start_play_control | L, R*S | Y |
| DVC1 | <stream-trans> | TRANSMISSION VIA STREAMING | <button> | STREAMING, MOVE, STOP | Start_stream_trans | L, R*S | Y |
| DVC1 | <shot-movie> | — | — | — | Start_shot_movie | L, R | N |
| SERVER1 | <service-tv-telephone> | — | — | — | Start_shot_movie | L, R | N |
| CONJ | <conj-stream-play> | CONJUNCTIVE PLAY VIA STREAMING | <button> | START, STOP | — | L, R | Y | ly
INFORMATION PROCESSING DEVICE AND HOME NETWORK SYSTEM

FIELD OF THE INVENTION

The present invention relates to information processing devices and home network systems, particularly to technologies for generating a user interface allowing networked devices to remotely control each other and a user interface for controlling conjunctive operations between the networked devices.

BACKGROUND OF THE INVENTION

In recent years, there have been proposed technologies in which household electrical appliances are connected to an in-home network through which a plurality of household electrical appliances are remotely controlled to operate conjunctively. For example, Japanese Laid-Open Patent Publication No. 2003-22224 discloses a technology in which a conjunctive operation table is used to present to the user a user interface for performing conjunctive operations.

In conventional conjunctive operation control, the user interface is uniformly presented to the user based on a predetermined conjunctive operation table. Therefore, there are problems where a user interface in accordance with the type of a terminal device to be remotely controlled might not be presentable to the user, any device controlled by a different protocol might not be controllable, and furthermore, a wide variety of services provided via the Internet might not be utilizable.

In view of such problems, the present invention aims to provide an information processing device capable of dynamically generating a user interface in accordance with the type of each device and presenting the user interface to the user, in which the user interface is used for controlling the information processing device, remotely controlling at least one other device connected to a network, and controlling conjunctive operations between the information processing device and the other device. The present invention also aims to provide an information processing device capable of dynamically generating a user interface as described above in accordance with the type of each information processing device controlled by a different protocol and presenting the user interface to the user. The present invention further aims to provide a home network system consisting of such information processing devices.

BRIEF SUMMARY OF THE INVENTION

To attain the above objects, the present invention provides an information processing device connected to at least one other information processing device via a network, the information processing device including:

a local control procedure list storage portion having stored therein a local control procedure list being a synopsis of control procedures for controlling the information processing device and conditions under which the control procedures are executable;

a local control procedure generation portion for generating a local control procedure based on the local control procedure list, the local control procedure presenting, to a user, information representing a control function of the information processing device that is executable in accordance with a status of the information processing device;

a remote control procedure generation portion for generating a remote control procedure for presenting a control procedure of the information processing device to the at least one other information processing device, based on the local control procedure;

a conjunctive control procedure table storage portion having stored therein a conjunctive control procedure table indicating a combination of the local control procedure and the remote control procedure and a name of the combination;

a communication portion having functions of transmitting/receiving the remote control procedure and the conjunctive control procedure table to/from the at least one other information processing device;

a conjunctive control procedure generation portion for generating a conjunctive control procedure based on the local control procedure, the remote control procedure received from the at least one other information processing device, the conjunctive control procedure table stored in the conjunctive control procedure table storage portion, and the conjunctive control procedure table received from the at least one other information processing device;

a menu script generation portion for generating a menu script based on the local control procedure, the remote control procedure, and the conjunctive control procedure, the menu script presenting data corresponding to an operating menu screen and an operational procedure on the menu screen to an internal user interface terminal device or a user interface terminal device connected via the network;

a menu script presentation portion for presenting the menu script to the user interface terminal device in accordance with a request from the user interface terminal device; and a control portion for controlling the information processing device and the at least one other information processing device to execute a control function corresponding to an instruction to execute the local control procedure, the remote control procedure, or the conjunctive control procedure, the instruction being given through an input to the menu screen displayed on the user interface terminal device in accordance with the menu script.

Here, in the information processing device according to the present invention, the menu script generation portion preferably determines whether to present the menu script to the user interface terminal device in accordance with conditions indicated for the local control procedure, the remote control procedure, and the conjunctive control procedure.

The local control procedure generation portion preferably generates the local control procedure based on:

a status of a device internal to the information processing device; and a device status of the at least one other information processing device obtained via the communication portion.

The remote control procedure generation portion preferably generates:

a new remote control procedure for the information processing device and a correspondence table between the generated remote control procedure and an original control procedure for the information processing device; or a new remote control procedure for the at least one other information processing device and a correspondence table between the generated remote control procedure for the information processing device and an original remote control procedure, and the original control procedure indicated in the correspondence table is preferably executed when instructed to execute the new remote control procedure generated.

The conjunctive control procedure table stored in the storage portion is preferably configured to be rewritable through user settings, downloading via the network, and reading from a recording medium, and the conjunctive control procedure table is preferably transmitted to the at least one other information processing device via the communication portion upon request from the at least one other information processing device via the network.

Here, the user interface terminal device is preferably an electronic device capable of interpreting the menu script, and it may be internal to the information processing device or may be connected to the information processing device. Also, a remote controller signal input portion may further be included for inputting a signal from a remote controller to provide an instruction to the user interface terminal device. Moreover, the user interface terminal device may be connected to the information processing device via the network.

Also, the information processing device may include an electronic circuit for collecting information concerning a device status of a device internal to the information processing device and information concerning a device status of the at least one other information processing device obtained by the communication portion, the collected information being presented to another circuit.

To attain the above objects, the present invention also provides an information processing device including:

a local control procedure generation portion for generating a local control procedure concerning a control procedure for any executable control function of the information processing device in accordance with a device status of the information processing device;

a remote control procedure reception portion for receiving a remote control procedure concerning a control procedure for controlling another device connected to the information processing device via a network;

a conjunctive control procedure generation portion for generating a conjunctive control procedure associated with a control procedure allowing the information processing device to operate in conjunction with the other device, based on the local control procedure and the remote control procedure;

a conjunctive control procedure transmission portion for transmitting the conjunctive control procedure to the other device; and a control portion for controlling the information processing device based on the conjunctive control procedure.

To attain the above objects, the present invention also provides an information processing device including:

a local control procedure generation portion for generating a local control procedure concerning a control procedure for any executable control function of the information processing device in accordance with a device status of the information processing device;

a remote control procedure generation portion for generating a remote control procedure concerning a control procedure for another device connected via a network to control the information processing device, based on the local control procedure;

a remote control procedure transmission portion for transmitting the remote control procedure to the other device;

a conjunctive control procedure reception portion for receiving a conjunctive control procedure concerning a control procedure generated by the other device based on the local control procedure and the remote control procedure, the control procedure allowing the information processing device to operate in conjunction with the other device; and a control portion for controlling the information processing device based on the received conjunctive control procedure.

Here, it is preferable that the control portion further have functions of: in response to a request from an internal user interface terminal device or a user interface terminal device connected via the network, presenting data corresponding to an operating menu screen and an operational procedure on the menu screen to the user interface terminal device based on the local control procedure, the remote control procedure, and the conjunctive control procedure; and executing the local control procedure, the remote control procedure, and the conjunctive control procedure in accordance with an input from the user interface terminal device.

It is preferable to further include a conjunctive control procedure transmission portion for transmitting the received conjunctive control procedure to the other device. Also, it is preferable to further include: a conjunctive control procedure generation portion for generating the conjunctive control procedure based on a conjunctive control procedure table being a synopsis of control procedures allowing the information processing device to operate in conjunction with the other device and conditions under which the control procedures are executable; and a conjunctive control procedure table transmission portion for transmitting the conjunctive control procedure table to the other device.

In addition, it is preferable to further include: a conjunctive control procedure table reception portion for receiving a conjunctive control procedure table being a synopsis of control procedures allowing the information processing device to operate in conjunction with the other device and conditions under which the control procedures are executable; and a storage portion having stored therein a previously created conjunctive control procedure table, wherein the conjunctive control procedure generation portion generates the conjunctive control procedure based on the received conjunctive control procedure table and the conjunctive control procedure table stored in the storage portion.

To attain the above objects, the present invention also provides a home network system including two or more of the aforementioned information processing devices interconnected via a network.

According to the present invention, an appropriate user interface for remote control and conjunctive operation control can be dynamically generated and presented to the user in accordance with the type of each information processing device connected via a network. Furthermore, an appropriate user interface for remote control and conjunctive operation control can be dynamically generated and presented to the user in accordance with the type of each information processing device controlled by a different protocol. Thus, a wide variety of services provided via the Internet can be utilized.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 3 is an explanatory diagram illustrating an exemplary local control procedure list for the information processing device shown in FIG. 1.

FIG. 4 is an explanatory diagram illustrating an exemplary conjunctive control procedure table for the information processing device shown in FIG. 1.

FIG. 6 is an explanatory diagram illustrating an exemplary menu list for the information processing device shown in FIG. 1.

FIG. 13 is an explanatory diagram illustrating an exemplary local control procedure list for a DVC device shown in FIG. 12.

FIG. 14 is an explanatory diagram illustrating an exemplary local control procedure list for a television phone server shown in FIG. 12.

FIG. 15 is an explanatory diagram illustrating an exemplary conjunctive control procedure table for the television phone server shown in FIG. 12.

FIG. 16 is an explanatory diagram illustrating an exemplary menu list for an information processing device shown in FIG. 12.

DETAILED DESCRIPTION OF THE INVENTION

First Embodiment

Figure 1:
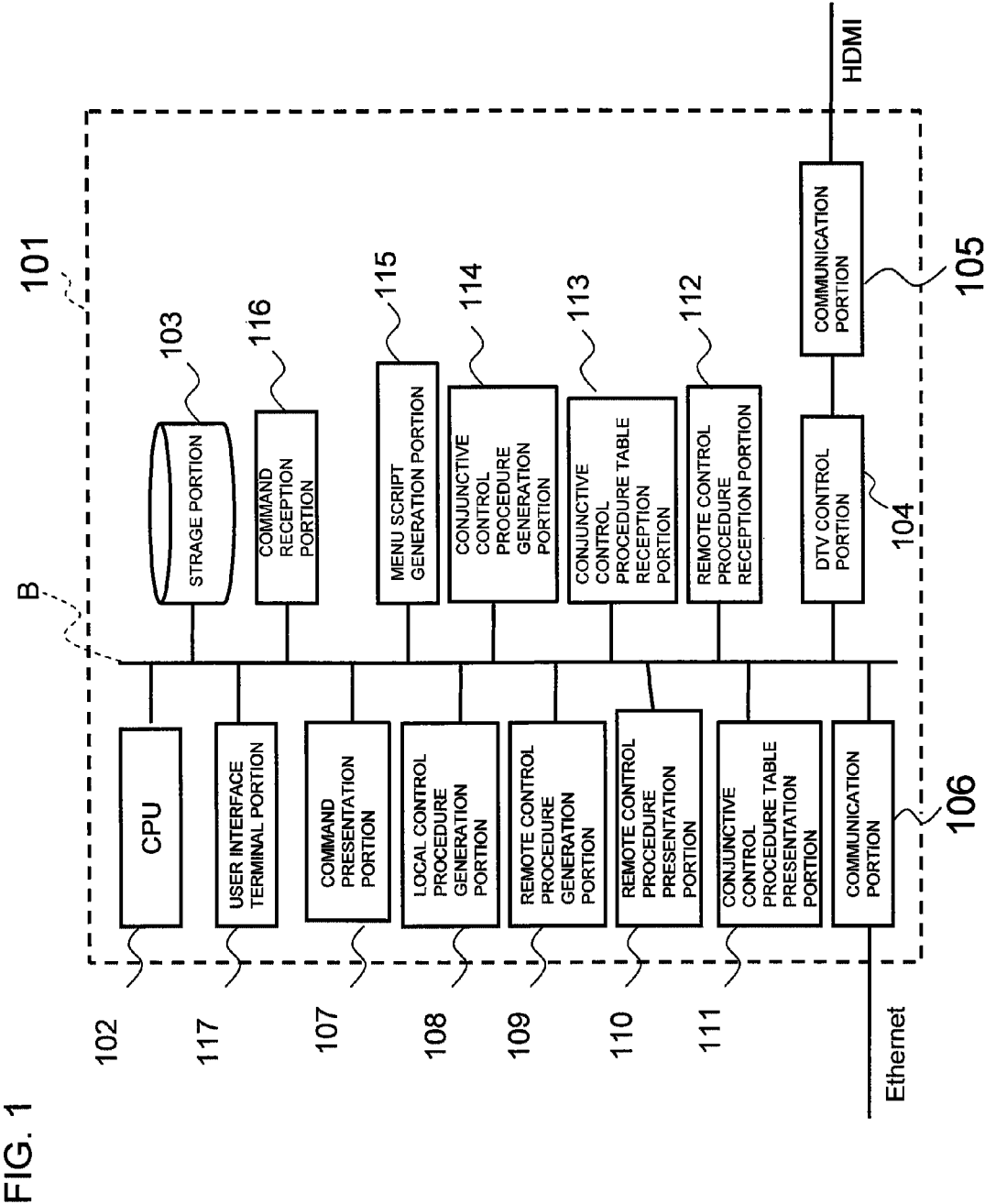
FIG. 1 is a block diagram illustrating the configuration of an information processing device according to a first embodiment of the present invention.

Hereinafter, an information processing device and a home network system according to the first embodiment will be described with reference to FIGS. 1 to 11. As shown in FIG. 1, the information processing device (101) according to the present embodiment includes a CPU 102, a storage portion 103, a DTV control portion 104, a communication portion 106, a command presentation portion 107, a local control procedure generation portion 108, a remote control procedure generation portion 109, a remote control procedure presentation portion 110, a conjunctive control procedure table presentation portion 111, a remote control procedure reception portion 112, a conjunctive control procedure table reception portion 113, a conjunctive control procedure generation portion 114, a menu script generation portion 115, a command reception portion 116, and a user interface terminal portion 117, which are interconnected via a bus B with the DTV control portion 104 further being connected to a communication portion 105.

The CPU 102, the storage portion 103, and the DTV control portion 104 collectively allow the information processing device (101) to function as a DTV device (a digital television device). Accordingly, in the present embodiment, the information processing device (101) is referred to as the "DTV device 101".

The storage portion 103 holds a local control procedure list (see FIG. 3) and a conjunctive control procedure table (see FIG. 4). The communication portion 105 is a device for performing communication via an HDMI (high-definition multimedia interface) terminal, and has functions of communicating video/audio using a digital signal and communicating with other networked devices using a control signal (command). The communication portion 106 has a function of communicating with other devices via an Ethernet terminal.

The command presentation portion 107, the local control procedure generation portion 108, the remote control procedure generation portion 109, the remote control procedure presentation portion 110, the conjunctive control procedure table presentation portion 111, the remote control procedure reception portion 112, the conjunctive control procedure table reception portion 113, the conjunctive control procedure generation portion 114, the menu script generation portion 115, and the command reception portion 116 constitute a "remote control function implementation portion" for providing the DTV device 101 with a function allowing the DTV device 101 to process information for performing remote control.

The remote control function implementation portion generates information required for the DTV device 101 to perform remote control, and transmits the generated information to other devices via the communication portions 105 and 106. In addition, the remote control function implementation portion receives information required for performing remote control from other devices, and analyzes the received information. Based on the analysis result, the remote control function implementation portion generates a menu script, which is a script specifying concrete contents of a user interface, and transmits/receives a command for performing remote control via the communication portions 105 and 106.

The user interface terminal portion 117 is an internal user interface terminal device having a WWW (world wide web) browser function. Concretely, the user interface terminal portion 117 has functions of receiving the menu script generated by the menu script generation portion 115, generating image data for the user interface in accordance with the description on the received menu script, and sending the generated image data to an OSD (on-screen display) section (not shown) of the DTV control portion 104, thereby causing a display device (not shown) associated with the DTV device 101 to display an image corresponding to the user interface. The DTV device 101 also has a function of executing the processing corresponding to an instruction signal received from an infrared remote controller via an infrared remote control reception section (not shown) of the DTV control portion 104, in accordance with the description on the menu script, thereby implementing an operation intended by the user with the infrared remote controller. Note that the user interface terminal portion 117 is configured to be able to interpret scripts, such as HTML, JavaScript ("Java" being a registered trademark), and XML.

Figure 2:
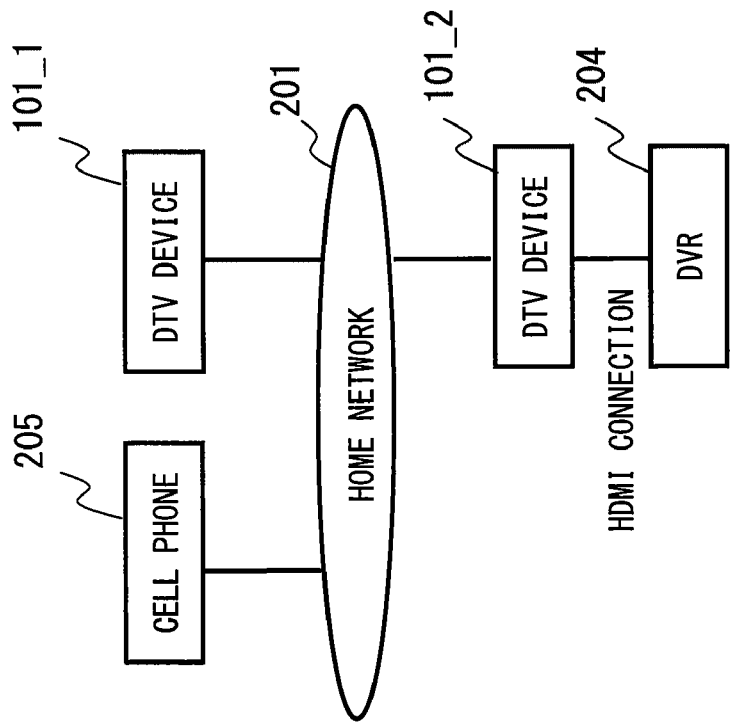
FIG. 2 is an explanatory diagram of a home network system including information processing devices as shown in FIG. 1.

Next, an example where two DTV devices 101 are connected to a network will be described with reference to FIG. 2. In the example, a DTV device 101_1, a DTV device 101_2, and a cell phone 205 are directly connected to an in-home network 201, and a DVR (digital video recorder) 204 is connected to the DTV device 101_2 by an HDMI cable. That is, the home network system of the first embodiment consists of four information processing devices in three types. Note that the in-home network 201 is a LAN network based on Ethernet, for example.

The cell phone 205 is a user interface terminal device connected via the in-home network 201, and has a WWW (world wide web) browser function. That is, the cell phone 205 has functions of: receiving scripts, such as HTML, JavaScript ("Java" being a registered trademark), and XML, which are used for controlling the user interface on the browser; displaying, on the screen, image data generated in accordance with the description on the script; and allowing execution of control corresponding to the user's input in accordance with the description on the script.

FIG. 3 illustrates an exemplary local control procedure list for the DTV devices 101_1 and 101_2. The local control procedure list 300 provides a synopsis of operational procedures (hereinafter, referred to as "operational commands", or simply "commands") for the DTV device 101 to control the device itself (hereinafter, referred to as the "local device"; other devices being referred to as "remote devices"), along with conditions under which the respective operational commands are executable. Concretely, the local control procedure list 300 contains the following items for each operational command: operation name (command name) 301; display name 302; display format 303; value 304; device control function 305; and disclosing condition 306.

The operation name 301 is an item for storing a character string for identifying each operational command. The display name 302 is an item for storing a character string which corresponds to the operational command and is displayed within the user interface on the screen of the display device.

The display format 303 is an item for storing a character string which corresponds to the operational command and indicates the type of a part (widget) displayed on the user interface to prompt the user to an action. In the example shown in the figure, the character string <button> represents a button, the character string <pulldown> represents a pull-down menu, and the character string <bool> represents a button having its function changed each time it is selected and executed.

The value 304 is an item for storing an element(s) of the widget for the operational command. For example, the widget for the operational command <power> has elements "ON" and "OFF". In addition, the widget for the operational command <input-mode> has elements "TD (terrestrial digital)", "BS", "CS", "HDMI", and "network". Note that "-" denoted for the items "display name 302", "display format 303", and "value 304" for the operational command <stream-trans> in FIG. 3 indicates that there are no corresponding widgets required to be displayed on the user interface.

The device control function 305 is an item for storing a function used for controlling the DTV control portion 104 when the command reception portion 116 executes a received command or control procedure or when the user interface terminal portion 117 executes a menu script. The disclosing condition 306 is an item for storing conditions under which the operational command is presented as a control procedure in each process to be described later or a menu script is generated based on the operational command. The disclosing condition 306 consists of the following sub-items: disclosing destination condition 307, UI display condition 308, and device status condition 309.

The disclosing destination condition 307 is an item for storing conditions concerning the type or location of the user interface terminal device having requested the menu script, and the status of the DTV control portion 104. For example, the condition "L" is a condition that the menu script has been requested by the user interface terminal portion 117 of the local device, and the condition "R" is a condition that the menu script has been requested by the user interface terminal device serving as the remote device. In addition, the condition "R*S" represents a condition that the menu script has been requested by the user interface terminal serving as the remote device, and the DTV control portion 104 of the local device is performing reception via streaming.

The UI display condition 308 is an item for storing a condition as to whether to display a widget(s) corresponding to the operational command on the user interface. For example, in the case of "Y", the widget is displayed on the user interface, whereas in the case of "N", the widget is not displayed on the user interface. The device status condition 309 is an item for storing a condition for the device status of the DTV control portion 104 as to whether to present the operational command as a procedure as described above, e.g., a condition concerning the status of connection with another device. Concretely, when the device status condition 309 is indicated as "no consideration", the operational command is presented unconditionally, whereas when the condition is indicated as "DVR should be connected via HDMI", if the DVR 204 is connected to the communication portion 103 via an HDMI cable, the operational command is presented as the procedure.

As described above, in the local control procedure list 300, one operational command corresponds to the operation name 301, the display name 302, the display format 303, the value 304, the device control function 305, and the disclosing condition 306 (the disclosing destination condition 307, the UI display condition 308, and the device status condition 309) in one row. Hereinafter, each row in the local control procedure list 300, as well as in a conjunctive control procedure table 400 and a menu list ML, which will be described later, will be referred to as a "control procedure row".

FIG. 4 illustrates an exemplary conjunctive control procedure table for the DTV devices 101_1 and 101_2. The conjunctive control procedure table 400 is stored in the storage portion 103 as described above, and is configured such that contents thereof can be rewritten through user settings, downloading via the network, and reading from a recording medium. The conjunctive control procedure table 400 contains information about conjunctive control commands allowing the local device and the remote device to operate conjunctively. Concretely, the conjunctive control procedure table 400 contains the following items for each conjunctive control command: operation name (command name) 401, display name 402, display format 403, value 404, disclosing condition 406, disclosing destination condition 407, UI display condition 408, required command 410, and execution command 411. The items "operation name 401", "display name 402", "display format 403", "value 404", "disclosing condition 406", "disclosing destination condition 407", and "UI display condition 408" in the conjunctive control procedure table 400 correspond to their respective items "operation name 301", "display name 302", "display format 303", "value 304", "disclosing condition 306", "disclosing destination condition 307", and "UI display condition 308" in the local control procedure list 300.

Note that the required command 410 indicates a combination of operational commands for effecting the conjunctive control command. In the example shown in the figure, the operational commands <stream-recv> and <stream-trans> in the local control procedure list 300 of FIG. 3 are indicated under the required command 410 for the conjunctive control command with the operation name 401 "<conj-stream-play>". Concretely, this means that, when a local control procedure (to be described later) includes the operational command <stream-recv>, and a remote control procedure (to be described later) includes the operational command <stream-trans>, the conjunctive control command <conj-stream-play> is executable in the local device.

The execution command 411 is an item for storing commands to be executed when executing the conjunctive control command. In the example shown in the figure, the operational commands <input-mode network>, <stream-recv>, and <stream-trans> in the local control procedure list 300 are indicated under the execution command 411 for the conjunctive control command <conj-stream-play>.

Next, a menu list generation process will be described. For each of the DTV devices 101_1 and 101_2, when the device is connected to the in-home network 201, a menu list ML, which is a list of control procedures for control that can be specified by the user with the local device, is generated. The menu list ML basically contains control procedures for the local device, the remote device, and the conjunctive operation.

FIG. 6 illustrates an exemplary menu list ML generated in the DTV device 101_1. Concretely, the menu list ML contains seven items: device ID 600, operation name 601, display name 602, display format 603, value 604, device control function 605, and disclosing condition 606. The disclosing condition 606 includes the following sub-items: disclosing destination condition 607 and UI display condition 608. The menu list ML provides a synopsis of devices and functions that can be utilized by the user with the DTV device 101_1 via the in-home network 201. In the present example, the user can utilize the following functions with the DTV device 101_1: functions of the DTV device 101_1 itself serving as the local device; functions of the DTV device 101_2 serving as the remote device; functions of the DVR 204 connected to the DTV device 101_2 via HDMI; and the conjunctive operation function allowing the DTV devices 101_1 and 101_2 to operate conjunctively.

The device ID 600 is an item for storing a character string indicating the device to which the operational command corresponds. In the example shown in the figure, the character string "DTV1" is used for the DTV device 101_1 serving as the local device, and the character string "DTV2" is used for the DTV device 101_2 serving as the remote device. In addition, the character string "DVC1" is used for the DVR 204 connected to the DTV device 101_2 via HDMI (see FIG. 16). Furthermore, the character string "CONJ" is used for the conjunctive operation between the DTV devices 101_1 and 101_2.

In the menu list ML of FIG. 6, the top seven rows with "DTV1" under the device ID 600 represent functions of the DTV device 101_1 that can be utilized by the user. Specifically, the operation name 601, the display name 602, the display format 603, the value 604, the device control function 605, and the disclosing condition 606 (the disclosing destination condition 607 and the UI display condition 608) in the top seven rows respectively indicate contents of the operation name 301, the display name 302, the display format 303, the value 304, the device control function 305, and the disclosing condition 306 (the disclosing destination condition 307 and the UI display condition 308) in the top seven rows of the local control procedure list 300 for the DTV device 101_1 (see FIG. 3).

Similarly, in the menu list ML of FIG. 6, eight rows descending from the eighth row with "DTV2" under the device ID 600 indicate functions of the DTV device 101_2 that can be utilized by the user via the DTV device 101_1. Specifically, the operation name 601, the display name 602, the display format 603, the value 604, the device control function 605, and the disclosing condition 606 (the disclosing destination condition 607 and the UI display condition 608) in the eight rows descending from the eighth row respectively indicate contents of the operation name 301, the display name 302, the display format 303, the value 304, the device control function 305, and the disclosing condition 306 (the disclosing destination condition 307 and the UI display condition 308) in the first control procedure row and the eighth to fourteenth control procedure rows from the top of the local control procedure list 300 of FIG. 3 for the DTV device 101_2.

Also, in a menu list ML shown in FIG. 16, five rows with "DVC1" under the device ID 600, starting from the eighth row from the top, indicate functions of the DVR 204 connected to the DTV device 102_1 via HDMI that can be utilized by the user via the DTV device 101_1.

Next, a menu list generation process to be executed under control of the CPU 102 in each of the DTV devices 101_1 and 101_2 connected to the in-home network 201 illustrated in FIG. 2 will be described with reference to FIG. 5. Note that the following description will be given on the assumption that the DTV device 101_2 (DTV2) is connected to the in-home network 201 first, and then the DTV device 101_1 (DTV1) is connected. When the DTV device 101_2 is connected to the in-home network 201, first, the menu list generation process is executed, deeming the DTV device 101_2 as the local device. Subsequently, when the DTV device 101_1 is connected to the in-home network 201, the menu list generation process is executed, deeming the DTV devices 101_1 and 101_2 as the local and remote devices, respectively.

First, the menu list generation process to be executed under control of the CPU 102 in the DTV device 101_2 when the DTV device 101_2 is connected to the in-home network 201 will be described with reference to FIG. 5.

In step S500, the device status of the DTV device 101_2 itself is checked through processing by the CPU 102 referring to the device status condition 309 in the local control procedure list 300 held in the storage portion 103 of the DTV device 101_2 serving as the local device in the current menu list generation process. Concretely, for the device status condition 309, i.e., the condition "DVR should be connected via HDMI", an inquiry is made to the DTV control portion 104 concerning whether the DVR 204 is connected via HDMI. In the present example, the DVR 204 is connected to the DTV device 101_2 via HDMI, and therefore the CPU 102 detects that the DVR 204 is currently connected. Then, control advances to step S501.

In step S501, in accordance with the detection result by the CPU 102, the local control procedure generation portion 108 writes into the menu list ML each item (local control procedure) in the control procedure rows with the device status condition 309 being satisfied in the local control procedure list 300 for the DTV device 101_2 held in the storage portion 103. In the present example, the device status condition 309 is satisfied in all control procedure rows in the local control procedure list 300, and therefore contents of the operation name 301, the display name 302, the display format 303, the value 304, the device control function 305, the disclosing condition 306, the disclosing destination condition 307, and the UI display condition 308 in all the control procedure rows of the local control procedure list 300 are respectively indicated under the operation name 601, the display name 602, the display format 603, the value 604, the device control function 605, the disclosing condition 606, the disclosing destination condition 607, and the UI display condition 608 in the menu list ML. At this time, "DTV2" is indicated under the device ID 601 in each control procedure row. Then, control advances to step S502.

In step S502, a determination is made concerning whether any remote control procedure, which is transmitted via processing in step S510 to be described later, has been received from the remote device. More concretely, an inquiry is made to the remote control procedure reception portion 112 concerning whether any remote control procedure transmitted from the remote device has been received. If the remote control procedure has been received, control advances to step S503, whereas if not, control advances to step S504. In the current process, the remote device is not connected to the in-home network 201, and therefore the remote control procedure reception portion 112 does not receive any remote control procedure. Accordingly, control advances to step S504. Note that the processing in step S503 will be described later.

In step S504, a determination is made in the DTV device 101_2 serving as the local device, concerning whether the condition for the required command 410 in the conjunctive control procedure table 400 held in the storage portion 103 is satisfied. If the condition for the required command 410 is satisfied, control advances to step S505, whereas if not, control advances to step S506. As described above, in the current process, there is no remote device connected to the in-home network 201. Accordingly, control advances to step S506. Note that the processing in step S505 will be described later.

In step S506, a determination is made concerning whether the DTV device 101_2 has received the conjunctive control procedure table 400 from the remote device. If the conjunctive control procedure table 400 has been received, control advances to step S507, whereas if not, control advances to step S509. As described above, in the current process, there is no remote device connected to the in-home network 201. Accordingly, control advances to step S509. Here, the processing in step S507, and the processing in step S508 subsequent thereto are the same as the contents of the above-described steps S504 and S505, respectively. The difference between the processing in steps S507 and S508 and the processing in steps S504 and S505 lies in that the conjunctive control procedure table 400 is held in the storage portion 103 (in the case of steps S504 and S505), or received from the remote device (in the case of steps S507 and S508). Note that the processing in steps S507 and S508 is executed in an example of the second embodiment to be described later.

In step S509, a determination is made concerning whether another device is connected to the in-home network 201. If another device is connected to the in-home network 201, control advances to step S510, whereas if not, the process is completed. In the current process, there is no remote device connected to the in-home network 201. Accordingly, the process is completed.

Next, the menu list generation process to be executed under control of the CPU 102 in the DTV device 101_1 when the DTV device 101_1 (DTV1) is connected to the in-home network 201 will be described.

In step S500, the device status of the DTV device 101_1 itself serving as the local device is checked referring to the device status condition 309 in the local control procedure list 300 held in the storage portion 103 of the DTV device 101_1. Concretely, for the device status condition 309, i.e., the condition "DVR is connected via HDMI", an inquiry is made to the DTV control portion 104 concerning whether the DVR 204 is connected via HDMI. In the present example, the DVR 204 is not connected to the DTV device 101_1 via HDMI, and therefore the CPU 102 detects that the DVR 204 is currently not connected. Then, control advances to step S501.

In step S501, contents of each control procedure row item satisfying the device status condition 309 in the local control procedure list 300 for the DTV device 101_1 serving as the local device are written into the menu list ML. Concretely, contents of the operation name 301, the display name 302, the display format 303, the value 304, the device control function 305, the disclosing condition 306, the disclosing destination condition 307, and the UI display condition 308 in each control procedure row other than the rows containing the device status condition 309 "DVR is connected via HDMI" in the local control procedure list 300 are respectively written under the operation name 601, the display name 602, the display format 603, the value 604, the device control function 605, the disclosing condition 606, the disclosing destination condition 607, and the UI display condition 608 in the menu list ML. At this time, "DTV1" is indicated under the device ID 601 in each row. Then, control advances to step S502.

In step S502, a determination is made concerning whether any remote control procedure has been received from the DTV device 101_2 serving as the remote device, giving the determination result "Yes", so that control advances to step S503. Note that transmission of the remote control procedure from the DTV device 101_2 is executed in step S510 in the process of FIG. 5, which is executed again in the DTV device 101_2 after the DTV device 101_1 is connected to the in-home network 201.

In step S503, all control procedure rows for the received remote control procedure are added to the menu list ML with the character string that represents the remote device being indicated under the device ID 601. In the present example, the character string "DTV2" that represents the DTV device 101_2 serving as the remote device is indicated under the device ID 601. Then, control advances to step S504.

In step S504, a determination is made in the DTV device 101_1 serving as the local device, concerning whether the condition for the required command 410 in the conjunctive control procedure table 400 held in the storage portion 103 is satisfied. In the present example, both the local control procedure for the DTV device 101_1 (see step S510), and the remote control procedure received from the DTV device 101_2 contain the operational commands <stream-recv> and <stream-trans>, and therefore the condition is satisfied. Accordingly, control advances to step S505.

In step S505, in response to the result of step S504, the character string "CONJ" representing the conjunctive operation is indicated under the device ID 601, so that contents of the control procedure row for the conjunctive operation shown in FIG. 4 are added to the menu list ML. Then, control advances to the next step S506.

In step S506 of the current process also, the conjunctive control procedure table 400 to be used is held in the storage portion 103, and therefore no conjunctive control procedure table is received from the remote device. Accordingly, the determination "No" is made, and control advances to step S509.

In step S509, the DTV device 101_2 serving as the remote device is connected to the in-home network 201. Accordingly, the determination "Yes" is made, and control advances to step S510.

In step S510, the remote control procedure generation portion 109 extracts, as a remote control procedure, each control procedure row item corresponding to the operational command with the device ID representing the local device and the disclosing destination condition being set as "R" in the menu list ML generated as the result of the processing in steps S501 to S509. The extracted remote control procedure is transmitted to another device via the communication portion 106.

Figure 5:
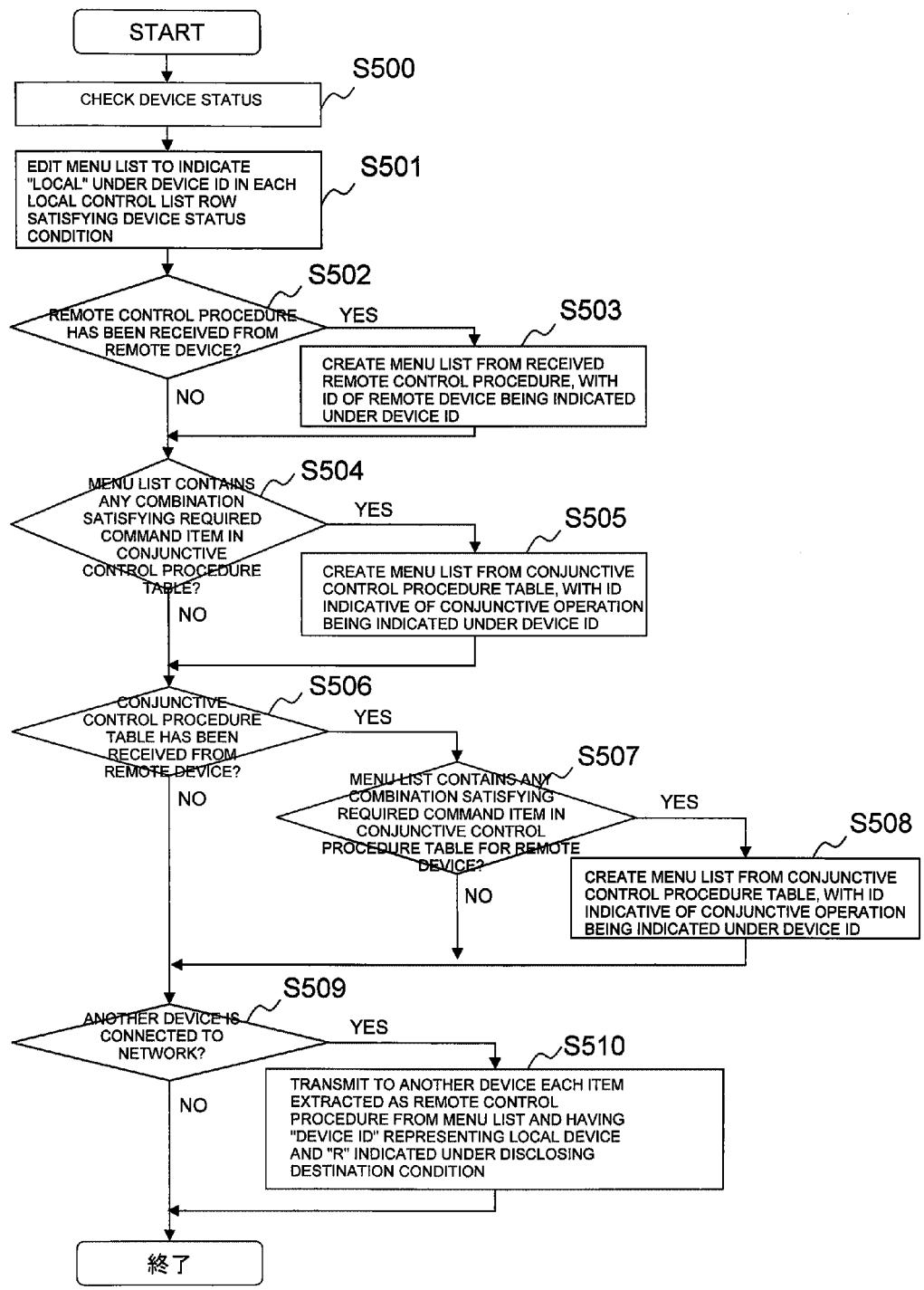
FIG. 5 is a flowchart representing a menu list generation process in the information processing device shown in FIG. 1.

Here, the menu list generation process in FIG. 5 is executed each time the device status of the local device or the remote device has changed or another device has been detected as being connected to the in-home network anew, or it is executed per predetermined period of time (a preset time period or a time period set by the user).

Figure 7:
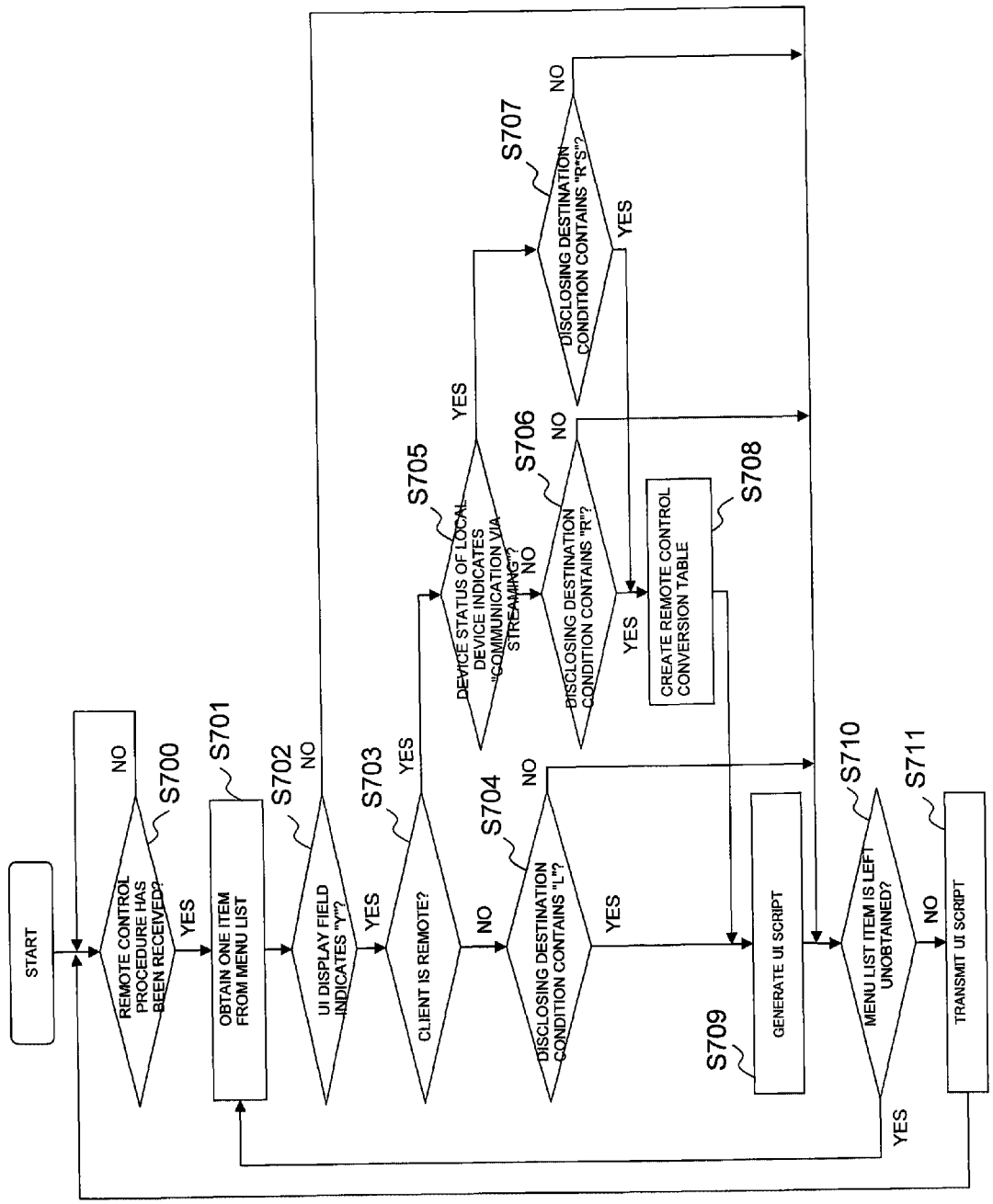
FIG. 7 is a flowchart representing a menu script process in the information processing device shown in FIG. 1.

Next, a menu script generation process for the menu script generation portion 115 to generate a menu script will be described with reference to FIG. 7.

When the DTV control portion 104 activates the user interface terminal portion 117, the user interface terminal portion 117 initially requests a menu script of the menu script generation portion 115. As a result, the menu script generation portion 115 starts generating the menu script.

First, in step S700, a determination is made concerning whether any remote control procedure has been received. When any remote control procedure is confirmed to have been received, control advances to step S701.

In step S701, one control procedure row is obtained from the menu list ML generated by the menu list generation process in FIG. 5. Then, control advances to the next step S702.

In step S702, a determination is made concerning whether the UI display condition 608 in the obtained control procedure row is "Y". If the UI display condition 608 is "Y", i.e., a widget corresponding to the operational command in the control procedure row is set to be displayed on the user interface, control advances to step S703. If the UI display condition 608 is "N", i.e., no widget corresponding to the operational command in the control procedure row is set to be displayed on the user interface, the process advances to step S710.

In step S703, a determination is made concerning whether the user interface terminal device having requested the menu script (hereinafter, referred to as the "client") is a remote device. If the client is a user interface terminal device serving as the local device, control advances to step S704. If the client is a remote device, control advances to step S705.

In step S704, a determination is made concerning whether the disclosing destination condition 607 for the disclosing condition 606 in the control procedure row obtained in step S701 contains "L". If the disclosing destination condition 607 contains "L", i.e., the condition is such that the menu script has been requested by the user interface terminal device serving as the local device, control advances to step S709. If the disclosing destination condition 607 does not contain "L", i.e., there is no condition such that the menu script has been requested by the user interface terminal device serving as the local device, control advances to step S710.

In step S705, a determination is made concerning whether the local device is in communication via streaming. If it is not in communication via streaming, control advances to step S706. If it is in communication via streaming, control advances to step S707.

In step S706, a determination is made concerning whether the disclosing destination condition 607 in the obtained control procedure row contains "R". If it contains "R", i.e., the condition is such that the menu script has been requested by the user interface terminal device serving as the remote device, control advances to step S708. If the disclosing destination condition 607 does not contain "R", i.e., there is no condition such that the menu script has been requested by the user interface terminal device serving as the remote device, control advances to step S710.

In step S707, a determination is made concerning whether the disclosing destination condition 607 in the obtained control procedure row contains "R*S". If the disclosing destination condition 607 contains "R*S", i.e., the condition is such that the menu script has been requested by the user interface terminal device serving as the remote device, and the DTV control portion 104 is performing reception via streaming, control advances to step S708. If the disclosing destination condition 607 does not contain "R*S", i.e., there is no condition such that the menu script has been requested by the user interface terminal device serving as the remote device, and the DTV control portion 104 is performing reception via streaming, control advances to step S710.

In step S708, a remote control conversion table is created. The creation of the remote control conversion table in the present step S708 is executed when the client is the remote device (Yes in S703), and the local device is in communication via streaming (Yes in S705), if the disclosing destination condition 607 in the control procedure row is such that the menu script has been requested by the user interface terminal portion 117 of the remote device, and the DTV control portion 104 is performing reception via streaming (Yes in S707). In addition, when the client is remote (Yes in S703), and the local device is not in communication via streaming (No in S705), if the disclosing destination condition 607 in the control procedure row designates the remote device as a disclosing destination (Yes in S706), the creation is executed. When the processing in the present step S708 is completed, control advances to step S709.

In step S709, a menu script corresponding to the control procedure row is generated. More concretely, the generated menu script contains the items "operation name 601", "display name 602", "display format 603", and "value 604" for the control procedure row in the menu list ML. The menu script is generated to consist of an HTML script and JavaScript ("Java" being a registered trademark).

As described above, the generation of the menu script in the present step S709 is executed when the client is local (No in S703), and the disclosing destination condition 607 contains "L" (Yes in S704) or when the remote control conversion table is generated in the above-described step S708. When the process of generating the menu script in the present step S709 is completed, control advances to step S710.

In step S710, a determination is made concerning whether any control procedure row in the menu list ML is left unobtained. If any control procedure row is left unobtained, control returns to the above-described step S701, where a new control procedure row is obtained from the menu list ML, and the processing in the above-described steps S702 to S709 is repeated. On the other hand, when no control procedure row is left unobtained, i.e., the processing in the above-described steps S702 to S709 has already been performed on all control procedure rows in the menu list ML, control advances to the next step S711.

In step S711, the menu script generated through the processing in steps S701 to S710 is transmitted from the menu script generation portion 115 to the user interface terminal device serving as the client. Then, control returns to the above-described step S700. The user interface terminal device serving as the client (i.e., the user interface terminal portion 117 of the DTV device 101_1 or 101_2, or the cell phone 205) displays the user interface in accordance with the received menu script.

Figure 8:
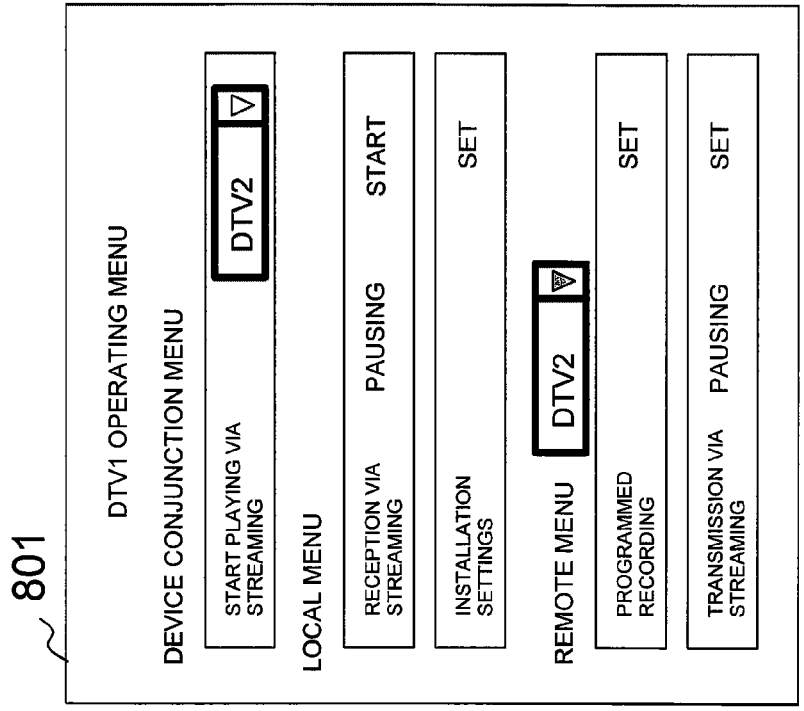
FIG. 8 is an explanatory diagram illustrating an exemplary operating menu to be presented on the information processing device shown in FIG. 1 based on a menu script generated in the information processing device.

FIG. 8 illustrates a DTV1 operating menu 801, which is an exemplary user interface (menu screen) to be displayed on the user interface terminal portion 117. The DTV1 operating menu 801 is a menu screen for the user to operate the DTV device 101_1 (DTV1) and the DTV device 101_2 (DTV2) via the DTV device 101_1.

Figure 9:
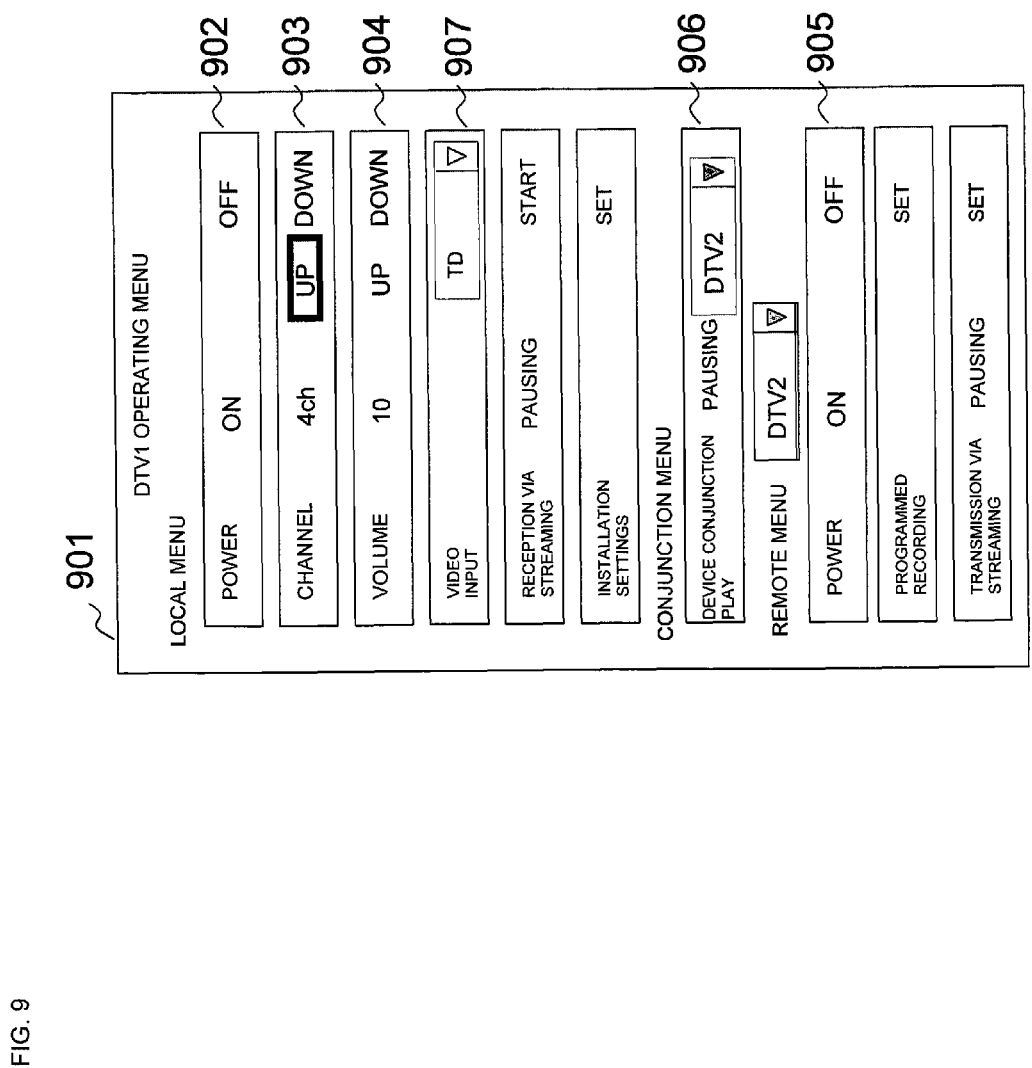
FIG. 9 is an explanatory diagram illustrating an exemplary operating menu to be presented on a cell phone based on a menu script generated in the information processing device shown in FIG. 1.

Also, FIG. 9 illustrates a DTV1 operating menu 901, which is an exemplary user interface (menu screen) to be displayed on the cell phone 205. The DTV1 operating menu 901 is a menu screen for the user to operate the DTV device 101_1 (DTV1) and the DTV device 101_2 (DTV2) via the cell phone 205.

Hereinafter, the operations of generating the DTV1 operating menu 801 shown in FIG. 8 and the DTV1 operating menu 901 shown in FIG. 9 through the process of FIG. 7 will be described concretely.

The menu script generation operation for generating the DTV1 operating menu 801 shown in FIG. 8 starts when the DTV control portion 104 of the DTV device 101_1 activates the user interface terminal portion 117, and the activated user interface terminal portion 117 requests a menu script of the menu script generation portion 115 as described above.

First, in step S700, a determination is made concerning whether any remote control procedure has been received. In the present example, since the menu script has been requested, the determination "Yes" is made, and control advances to step S701.

In step S701, one control procedure row is obtained from the menu list ML. Then, control advances to the next step S702.

In step S702, a determination is made concerning whether the UI display condition 608 in the obtained control procedure row is "Y". If the UI display condition 608 is "Y", control advances to step S703. On the other hand, if the UI display condition 608 is "N", control advances to step S710.

In step S703, a determination is made concerning whether the user interface terminal device (client) having requested the menu script is the DTV device 101_1 (local device) or another device (remote device). In the present example, the client is the local device, and therefore control advances to step S704.

In step S704, a determination is made concerning whether the disclosing destination condition 607 in the control procedure row obtained in step S701 contains "L". If the disclosing destination condition 607 contains "L", control advances to step S709 to generate a menu script, whereas, if not, control advances to step S710.

In step S709, a menu script consisting of an HTML script and JavaScript ("Java" being a registered trademark) is generated, containing contents of the operation name 601, the display name 602, the display format 603, and the value 604 in the control procedure row. The processing in the subsequent steps S710 and S711 is as described above.

Through the above-described processing, the menu script corresponding to the DTV1 operating menu 801 is generated, and the DTV1 operating menu 801 is displayed on the display device for the DTV device 101_1.

As shown in FIG. 8, a device conjunction menu, a local menu, and a remote menu are indicated on the DTV1 operating menu 801. In the example illustrated in the figure, the device conjunction menu presents a "play via streaming" widget (values: "start", "stop") allowing the local device (DTV1) to operate in conjunction with the remote device (DTV2). The local menu presents a "reception via streaming" widget (values: "pausing", "start"), which is a function of the local device (DTV1) itself, and an "installation settings" widget (value: "set"). The remote menu presents a "programmed recording" widget (value: "set") and a "transmission via streaming" widget (values: "pausing", "set") for the remote device (DTV2) to be operated from the local device (DTV1).

Next, the operation of generating the menu script in the DTV device 101_1 through the process of FIG. 7 in accordance with an instruction from the cell phone 205, and displaying the DTV1 operating menu 901 shown in FIG. 9 on the cell phone 205 based on the generated menu script will be described concretely.

When the cell phone 205 requests a remote control procedure of the communication portion 106 within the DTV device 101_1, the communication portion 106 requests that the remote control procedure presentation portion 110 present the remote control procedure.

When the remote control procedure presentation portion 110 is requested to present the remote control procedure, it requests a menu script of the menu script generation portion 115. When the menu script generation portion 115 receives the request for the menu script, the process of FIG. 7 starts. At this time, control advances through steps S700 (Yes), S701, and S702 (Yes) to step S703.

In the present example, since the client is the cell phone 205, the determination "Yes" is made in step S703, and control advances to step S705.

In the present example, since no communication via streaming is currently in progress, the determination "No" is made in step S705, and control advances to step S706.

In step S706, if the disclosing destination condition 607 in the control procedure row obtained in the above-described step S701 is determined to contain "R", control advances to step S709. Then, in step S709, a menu script for the control procedure row is generated, and control advances to the processing in steps S710 and S711. If the disclosing destination condition 607 in the control procedure row does not contain "R", control skips step S709 and advances to the processing in steps S710 and S711. Based on the menu script thus generated, the DTV1 operating menu 901 shown in FIG. 9 is displayed on the screen of the cell phone 205.

Note that as shown in FIG. 9, the DTV1 operating menu 901 displayed on the cell phone 205 differs from the DTV operating menu 801 shown in FIG. 8 in that the "local menu" additionally includes a power operation widget 902, a channel operation widget 903, a volume operation widget 904, and a video input widget 907, and the "remote menu" additionally includes a power operation widget 905 for operating the power of the DTV device 101_2. In this manner, an appropriate menu can be displayed in accordance with the type of the interface terminal device (information processing device).

Next, an example will be described with reference to FIGS. 10 and 11 in which the cell phone 205 remotely controls the DTV device 101_1 and the DVR 204 performs distribution via streaming for viewing on the DTV device 101_1. Concretely, when the user selects a device conjunction play widget 906 of a conjunctive menu in the DTV1 operating menu 901 displayed on the cell phone 205, the cell phone 205 transmits the conjunctive control command <conj-Stream-play> corresponding to the device conjunction play 906 to the DTV device 101_1 in accordance with an HTTP protocol. As a result, the process shown in FIG. 10 starts.

Figure 10:
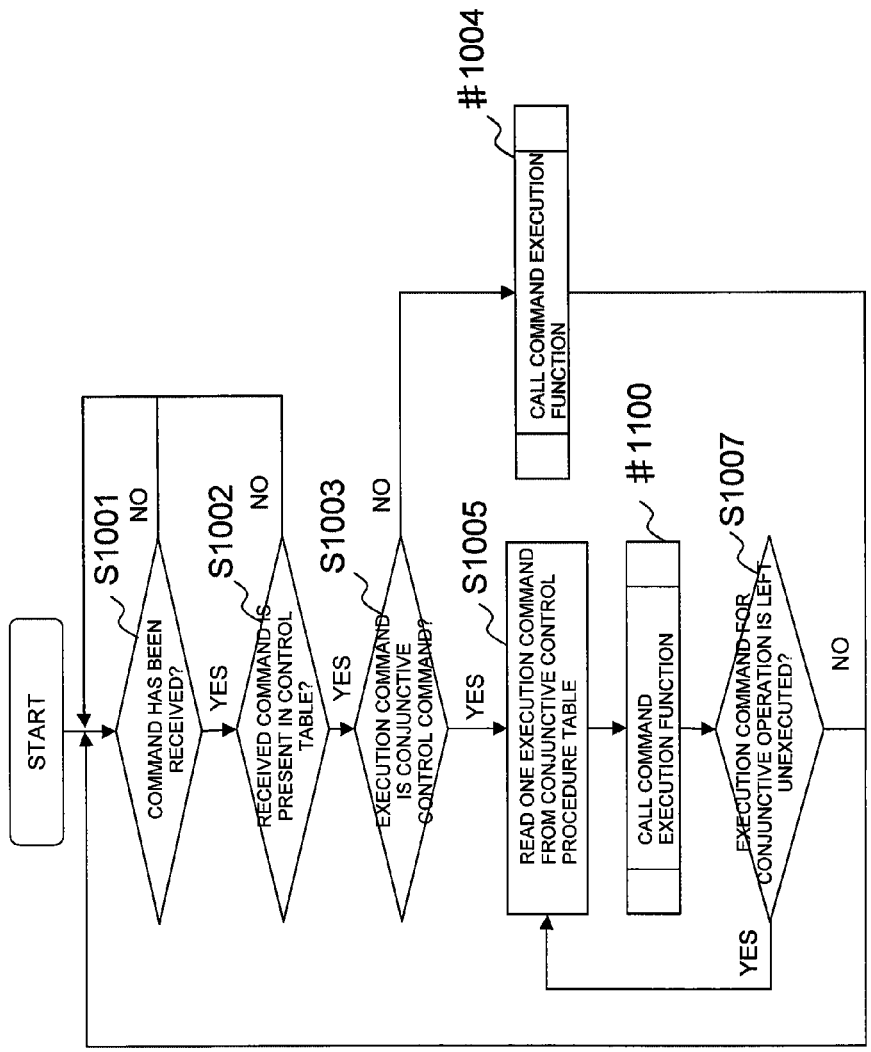
FIG. 10 is a flowchart representing a menu script generation process based on the operating menu shown in FIG. 9.

FIG. 10 is a flowchart illustrating the flow of a conjunctive control process executed under control of the CPU 102 of the DTV device 101_1.

First, in step S1001, a determination is made concerning whether any operational command has been received from the cell phone 205. When any operational command is confirmed to have been received, control advances to the next step S1002.

In step S1002, a determination is made concerning whether the received command is present in the menu list ML. If it is absent, control returns to step S1001. If the received command is present in the menu list ML, control advances to the next step S1003.

In step S1003, a determination is made concerning whether the received operational command is a conjunctive control command. If it is not a conjunctive control command, control advances to step #1004, whereas if it is a conjunctive control command, control advances to step S1005. In the present example, since the received command <conj-Stream-play> is a conjunctive control command, control advances to step S1005. Note that the processing in step #1004 will be described later.

In step S1005, one of the commands indicated under the execution command 411 in the control procedure row with the operation name 401 <conj-Stream-play> is read from the conjunctive control procedure table 400. In the present example, of these three commands <input-mode network>, <stream-recv>, and <stream-trans>, the command <input-mode network> is read first. Then, control advances to the next step #1100.

In step #1100, a command execution function call subroutine is executed in order to execute the command being read.

Figure 11:
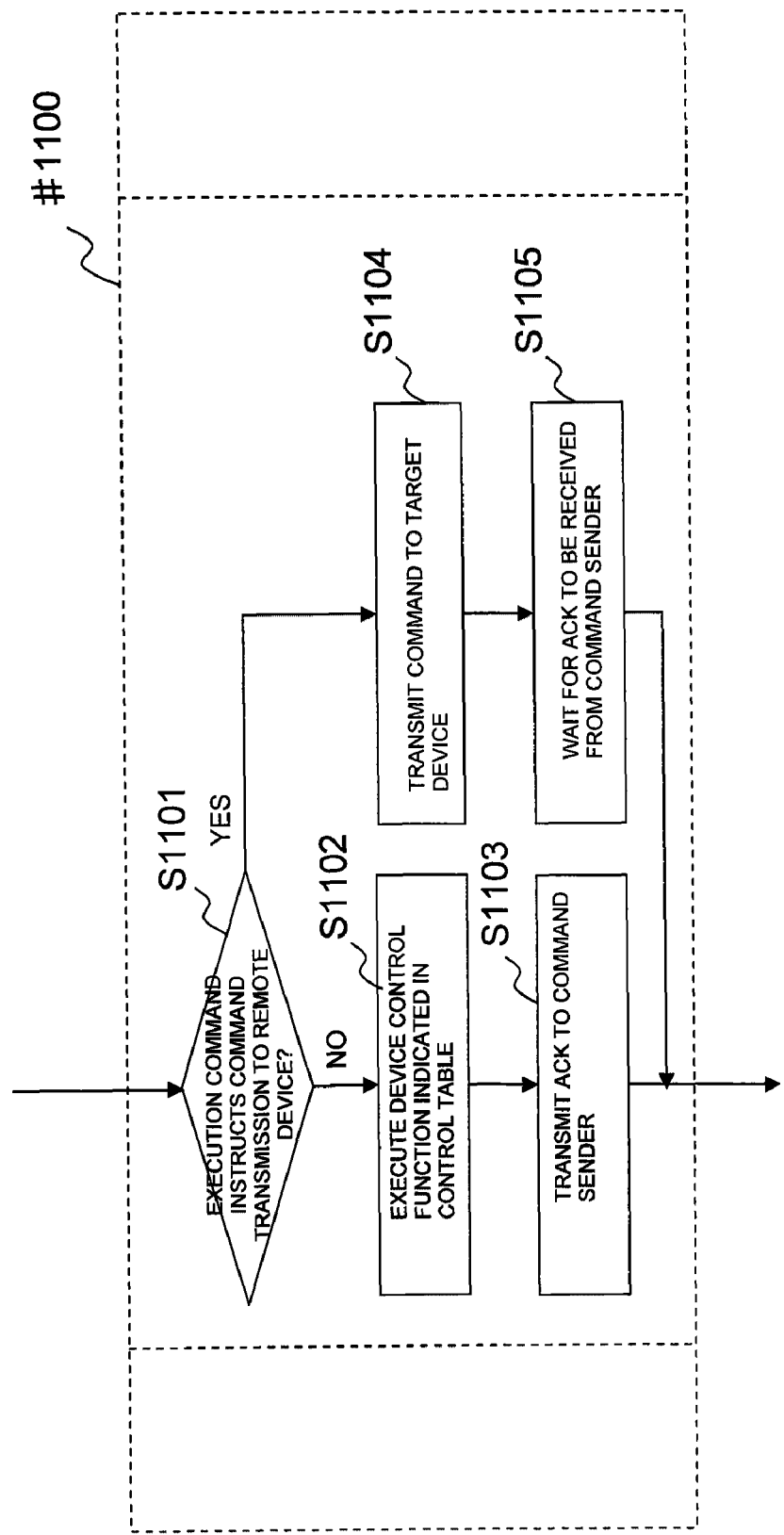
FIG. 11 is a flowchart representing a menu script generation process based on the operating menu shown in FIG. 10.

FIG. 11 illustrates the flow of the command execution function call subroutine. As shown in the figure, in the command execution function call subroutine, first, a determination is made in step S1101, concerning whether the command being read instructs command transmission to the remote device. If it does not instruct command transmission to the remote device, control advances to step S1102. If it instructs command transmission to the remote device, control advances to step S1104. In the present example, the command <input-mode network> does not instruct command transmission to the remote device, and therefore control advances to step S1102.

In step S1102, a device control function corresponding to the command being read is executed. In the present example, the device control function "Set_input_mode (network)" (where "network" is an argument) is called and executed, and the input mode of the DTV device 101_1 is set to "network" in the DTV control portion 104. Then, control advances to step S1103.

In step S1103, a response "ACK" (Acknowledgement) indicating that the command has been correctly received is transmitted to the command sender. Note that in the present example, the command sender is the DTV device 101_1 (local device) itself, and therefore no processing is performed for the transmitted response "ACK". Then, control advances to step S1007.

In step S1007, a determination is made concerning whether any execution command 411 for the conjunctive control command is left unexecuted. If there is any unexecuted command, control returns to step S1005. In the present example, the commands <stream-recv> and <stream-trans> under the execution command 411 are left unexecuted, control returns to step S1005, and then the command <stream-recv> is read before control advances again to the command execution function call subroutine in step #1100.

In the current command execution function call subroutine also, since the command <stream-recv> is not a command to instruct command transmission to the remote device, control advances through step S1101 to step S1102, and the function "Set_Stream_recv( )" corresponding to the command <stream-recv> is called and executed. As a result, the DTV control portion 104 is brought into a standby state, waiting for a streaming signal to be received via the communication portion 106.

Then, in step S1007, a further command under the execution command 411 is determined to be left unexecuted, and the command <stream-trans> is read at the end in step S1005. Then, in step S1101, the command <stream-trans> is determined to be a command instructing command transmission to the remote device, and control advances to step S1104.

In step S1104, the command <Stream-trans> is transmitted to the DTV device 101_2. Then, control advances to the next step S1105.

In step S1105, there is a wait for a response "ACK to be returned from the DTV device 101_2, the command sender.

Here, when the DTV device 101_2 receives the command <Stream-trans>, the processing from step S1001 in FIG. 10 is executed in the DTV device 101_2, and control advances through the processing in steps S1002, S1003, S1005, and S1101 to the processing in step S1102. In step S1102, the function "Set_Stream_trans( )" is called. In accordance with the called function "Set_Stream_trans( )", the DTV control portion 104 controls the DVR 204 to start outputting video and audio via HDMI, and also controls the communication portion 106 to transmit a streaming signal obtained through conversion of the video and audio signals received via HDMI.

Then, in step S1103, a response "ACK" is transmitted to the command sender (DTV device 101_1). Next, in the present example, no command is determined in step S1007 to be left unexecuted, and control in the DTV device 101_2 returns to step S1001. On the other hand, the DTV device 101_1 receives the response "ACK" from the DTV device 101_2, so that the standby state in step S1105, waiting for the response "ACK" to be received, is released, and control advances to step S1007. In the current process, there is no unexecuted command, and therefore control returns to step S1001.

Also, in the above-described step S1003, if the execution command is determined not to be a conjunctive control command, control returns to step S1001 via a command execution call subroutine in step #1004. The command execution function call subroutine in step #1004 is the same as the above-described command execution function call subroutine in step #1100.

With the above-described processing, it becomes possible to remotely control the DTV device 101_1 from the terminal device, i.e., the cell phone 205, and view streaming distributed by the DVR 204 on the DTV device 101_1.

As described above, the information processing device according to the present embodiment makes it possible to allow the information processing device itself or another terminal device (e.g., a cell phone) to present a user interface for controlling the information processing device itself, remotely controlling at least one other device connected to the network, and controlling a conjunctive operation between the information processing device and the other device. Accordingly, the user can use one information processing device connected to a network to control all other networked devices and a conjunctive operation between a plurality of devices. Furthermore, the device of the present embodiment makes it possible to allow a menu script to be generated such that an appropriate user interface can be presented in accordance with the status of the device and the type of the terminal device to be remotely controlled. Accordingly, a conjunctive operation between a plurality of information processing devices can be readily performed, and an appropriate user interface can be presented to the user in accordance with the status of the device and the type of the terminal device to be remotely controlled. Thus, it is possible to provide the user with a user interface that facilitates remote control of networked devices and control of a conjunctive operation therebetween.

Second Embodiment

Hereinafter, an information processing device and a home network system according to the second embodiment of the present invention will be described with reference to FIGS. 12 to 16. Note that the information processing device 101 according to the present embodiment is configured in the same manner as in the first embodiment, and therefore any description thereof will be omitted.

Figure 12:
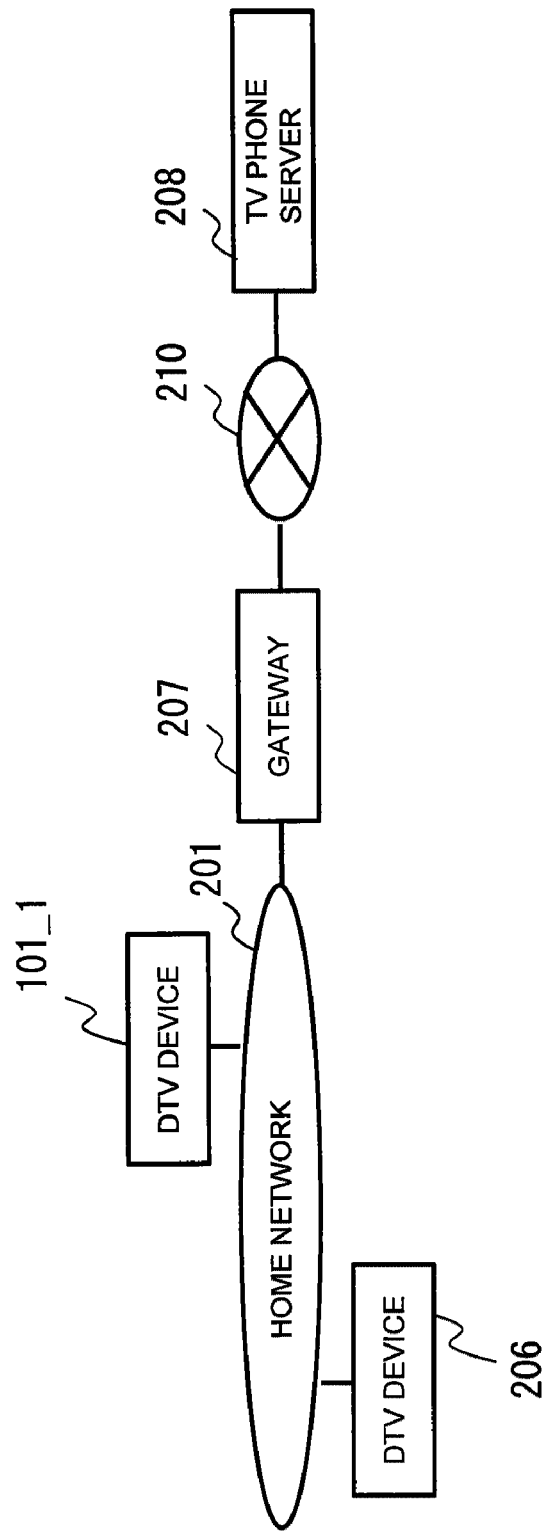
FIG. 12 is an explanatory diagram of a home network system according to a second embodiment of the present invention.

In the present embodiment, a DTV device 101_1, a DVC (digital video cassette) device 206, and a gateway 207 are connected to an in-home network 201, as shown in FIG. 12. The gateway 207 is connected to a TV phone server 208 via the Internet 210. The gateway 207 controls communication between the in-home network 201 and the Internet 210.

That is, the home network system in the present embodiment implements services in conjunction with a device on the Internet 210 (in the present example, the TV phone server 208). Note that the DVC device 206 is a digital video camera having the configuration of the information processing device (101) in the first embodiment, and can be used as an imaging device and a microphone for TV phone services provided by the TV phone server 208.

FIG. 13 illustrates an exemplary local control procedure list 300 for the DVC device 206. The configuration of the local control procedure list 300 has been already described with reference to FIG. 6. In the present example, the operational command with the operation name 301 <power> corresponds to a "power ON/OFF" function, and the operational command with the operation name 301 <play> corresponds to a "start/stop playing" function. Also, the operational command with the operation name 301 <play-control> corresponds to a "movie rewinding/fast-forwarding" function, the operational command with the operation name 301 <stream-trans> corresponds to a "transmission via streaming" function, and the operational command with the operation name 301 <shot-movie> corresponds to a "movie/audio acquisition" function.

FIG. 14 illustrates an exemplary local control procedure list for the television phone server 208. The command with the operation name 301 <service-TV-telephone> corresponds to a television phone function.

FIG. 15 illustrates an exemplary conjunctive control procedure table 400 for the television phone server 208. The conjunctive control procedure table 400 in the present example differs from the conjunctive control procedure table 400 shown in FIG. 4 in that the display format 403, the value 404, and the disclosing condition 406 (the disclosing destination condition 407 and the UI display condition 408) are not included. Note that the command with the operation name 401 <conj-tv-telephone> corresponds to a conjunctive television phone function. Also, when two commands are indicated in one row as in the case of the required commands 410 "<stream-trans>" and "<shot-movie>" in the example shown in the figure, the commands <stream-trans> and <shot-movie> are both required to be executable in the same device.

When the DTV device 101_1 requests a menu script of the TV phone server 208 via the gateway 207, the TV phone server 208 transmits the menu script, along with a remote control procedure and a conjunctive control procedure table 400. The DTV device 101_1 receives a remote control procedure and a conjunctive control procedure table 400 transmitted from the DVC device 206, as well as the remote control procedure and the conjunctive control procedure table 400 transmitted from the TV phone server 208, and executes the menu list generation process of FIG. 5 to create a menu list ML. Here, the creation of the menu list based on the conjunctive control procedure table 400 received from the TV phone server 208 is executed through the processing in steps S507 and S508 as described above, rather than through the processing in steps S504 and S505.

FIG. 16 illustrates by way of example the menu list ML created in the present embodiment. In the present embodiment, the condition for the required command 410 concerning the command <conj-tv-telephone> for the conjunctive television phone function in FIG. 15 is satisfied, and therefore the command is validated. Accordingly, when the user instructs execution of the conjunctive television phone command <conj-tv-telephone> through the user interface terminal portion 117 of the DTV device 101_1, the command <service-tv-telephone> in FIG. 16 is transmitted to the TV phone server 208 as in the first embodiment, starting communication via the television phone. At this time, the DVC device 206 distributes shot movie data and audio data from an associated microphone to the TV phone server 208. Also, the DTV device 101_1 outputs movie and audio data received from the TV phone server 208 through an associated display device and loudspeakers.

As described above, the present embodiment allows the TV phone function to be readily executed in conjunction with services on the Internet. Note that the exemplary TV phone function has been described here as a conjunctive service on the Internet, but the present invention is applicable to other conjunctive services on the Internet.

The present invention is useful for home networking, for example.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An information processing device connected to at least one other information processing device via a network, the information processing device comprising:

a local control procedure list storage portion having stored therein a local control procedure list being a synopsis of control procedures for controlling the information processing device and conditions under which the control procedures are executable;

a local control procedure generation portion for generating a local control procedure based on the local control procedure list, the local control procedure presenting, to a user, information representing a control function of the information processing device that is executable in accordance with a status of the information processing device;

a remote control procedure generation portion for generating a remote control procedure for presenting a control procedure of the information processing device to the at least one other information processing device, based on the local control procedure;

a conjunctive control procedure table storage portion having stored therein a conjunctive control procedure table indicating a combination of the local control procedure and the remote control procedure and a name of the combination;

a communication portion having functions of transmitting/receiving the remote control procedure and the conjunctive control procedure table to/from the at least one other information processing device;

a conjunctive control procedure generation portion for generating a conjunctive control procedure based on the local control procedure, the remote control procedure received from the at least one other information processing device, the conjunctive control procedure table stored in the conjunctive control procedure table storage portion, and the conjunctive control procedure table received from the at least one other information processing device;

a menu script generation portion for generating a menu script based on the local control procedure, the remote control procedure, and the conjunctive control procedure, the menu script presenting data corresponding to an operating menu screen and an operational procedure on the menu screen to an internal user interface terminal device or a user interface terminal device connected via the network;

a menu script presentation portion for presenting the menu script to the user interface terminal device in accordance with a request from the user interface terminal device; and a control portion for controlling the information processing device and the at least one other information processing device to execute a control function corresponding to an instruction to execute the local control procedure, the remote control procedure, or the conjunctive control procedure, the instruction being given through an input to the menu screen displayed on the user interface terminal device in accordance with the menu script.

2. The information processing device according to claim 1, wherein the menu script generation portion determines whether to present the menu script to the user interface terminal device in accordance with conditions indicated for the local control procedure, the remote control procedure, and the conjunctive control procedure.

3. The information processing device according to claim 1, wherein the local control procedure generation portion generates the local control procedure based on a status of a device internal to the information processing device and a device status of the at least one other information processing device obtained via the communication portion.

4. The information processing device according to claim 1, wherein, the remote control procedure generation portion generates:
a new remote control procedure for the information processing device and a correspondence table between the generated remote control procedure and an original control procedure for the information processing device; or
a new remote control procedure for the at least one other information processing device and a correspondence table between the generated remote control procedure for the information processing device and an original remote control procedure, and
the original control procedure indicated in the correspondence table is executed when instructed to execute the new remote control procedure generated.

5. The information processing device according to claim 1, wherein,
the conjunctive control procedure table stored in the storage portion is configured to be rewritable through user settings, downloading via the network, and reading from a recording medium, and
the conjunctive control procedure table is transmitted to the at least one other information processing device via the communication portion upon request from the at least one other information processing device via the network.

6. The information processing device according to claim 1, wherein the user interface terminal device is an electronic device capable of interpreting the menu script.

7. The information processing device according to claim 6, wherein the user interface terminal device is internal to the information processing device.

8. The information processing device according to claim 6, wherein the user interface terminal device is connected to the information processing device.

9. The information processing device according to claim 8, wherein the user interface terminal device is connected to the information processing device via the network.

10. The information processing device according to claim 1, further comprising a remote controller signal input portion for inputting a signal from a remote controller to provide an instruction to the user interface terminal device.

11. The information processing device according to claim 1, comprising an electronic circuit for collecting information concerning a device status of a device internal to the information processing device and information concerning a device status of the at least other information processing device obtained by the communication portion, the collected information being presented to another circuit.

12. An information processing device comprising:
a local control procedure generation portion for generating a local control procedure concerning a control procedure for any executable control function of the information processing device in accordance with a device status of the information processing device;
a remote control procedure reception portion for receiving a remote control procedure concerning a control procedure for controlling another device connected to the information processing device via a network;
a conjunctive control procedure generation portion for generating a conjunctive control procedure associated with a control procedure allowing the information processing device to operate in conjunction with the other device, based on the local control procedure and the remote control procedure;
a conjunctive control procedure transmission portion for transmitting the conjunctive control procedure to the other device;
a control portion for controlling the information processing device based on the conjunctive control procedure,
a conjunctive control procedure table reception portion for receiving a conjunctive control procedure table being a synopsis of control procedures allowing the information processing device to operate in conjunction with the other device and conditions under which the control procedures are executable; and
a storage portion having stored therein a previously created conjunctive control procedure table,
wherein the conjunctive control procedure generation portion generates the conjunctive control procedure based on the received conjunctive control procedure table and the conjunctive control procedure table stored in the storage portion.

13. A home network system comprising two or more of the information processing devices of claims 1-11 or 12 interconnected via a network.

* * * * *